Sept. 6, 1932.     D. V. CUMMINS     1,876,275
CRIPPLE SWIM BAIT
Filed Oct. 8, 1931

INVENTOR
Delbert V. Cummins,
BY Samuel Herrick
ATTORNEY

Patented Sept. 6, 1932

1,876,275

UNITED STATES PATENT OFFICE

DELBERT V. CUMMINS, OF WILMOT, SOUTH DAKOTA, ASSIGNOR TO FRANCES M. CUMMINS, OF WILMOT, SOUTH DAKOTA

CRIPPLE SWIM BAIT

Application filed October 8, 1931. Serial No. 567,734.

This invention relates to fish bait, and it has for its object to provide a lure or bait of the float type adapted to be drawn through water and to attract fish by simulating the appearance of a smaller fish.

I have designated this bait the "cripple swim bait" because it is so designed as to simulate, in action, the movements of a crippled fish. Such movement as this attracts the larger fish because he feels that he can easily capture a crippled fish.

Further objects and advantages of the invention will be set forth in the detailed description as follows:

In the drawing

Like numerals designate corresponding parts in all the figures of the drawing.

Figure 1:
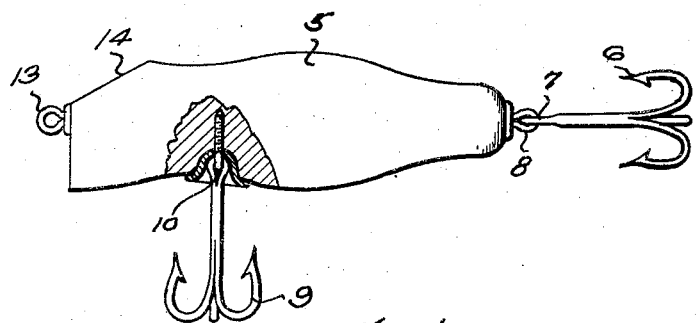
Figure 1 is a side elevation of the device of the present invention.
Figure 2:
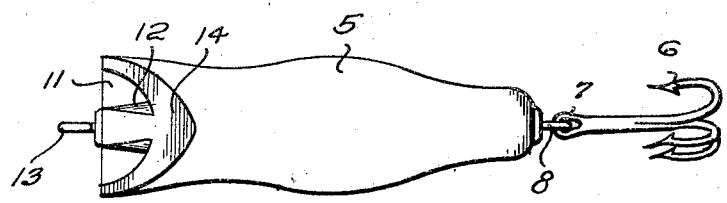
Fig. 2 is a plan view thereof.
Figure 3:
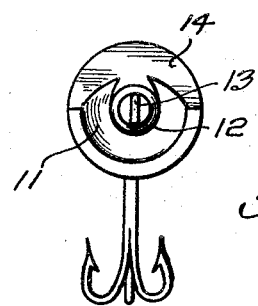
Fig. 3 is a front end elevation.

Referring to the drawing, 5 designates the body of the lure which is preferably made of soft wood, but may be made of any suitable material. A group of hooks 6 is pivotally connected, through the eyes 7 and 8, with the rear end of the body, while a second group of hooks 9, preferably three in number, is pivotally connected, at 10, to the body, and hang downwardly therefrom. The principal feature of the invention and the feature which results in imparting an erratic movement to the float in simulation of the movements of a wounded or crippled fish, resides in the formation of the float or head end of the body 5.

The head end of the body is cut out to form a conical cup-like depression 11. A heart or plug 12, also of conical formation, projects centrally from the bottom of the depression 11 and carries an eye 13 at its forward end to which a fish line may be attached. The forward upper end of the body 5 is cut away at about a twenty degree angle from the horizontal axis, cutting the conical plug 12 above the center and leaving what is substantially a half cone in the center at the front end of the lure.

As before stated, when this lure is pulled slowly through the water, its action is like that of a crippled fish. Some fish when crippled are forced to lie on their side, but the action of this fish bait resembles one which is able to swim away with a crippled swimming motion. This action of the fish bait, when pulled through the water, is caused by the passage of the water through the conical depression 11. The water is forced to escape around the conical heart 12 and out of the top of the half conical depression left by the cutting away of the upper forward end of the body 5, as indicated at 14. This action of the water causes the bait to vibrate from side to side, and its vibrations are equal since the pressure is varied equally, thus giving the fish bait a life-like action.

The lure swims through the water at about a 30° angle thus protecting the hooks from weeds by the body of the bait. The hooks are so protected that the fish bait is practically weedless. The front set of hooks is placed at the vertical axis of the fish bait which is about 1⅛ inches from the front of the fish bait. This keeps the front set of hooks in one position while the fish bait is in action. This set of hooks hangs downwardly and is not allowed to wobble from side to side, thus avoiding foul strikes. The rear set of hooks is attached to the back of the fish and hangs straight down from the fish bait.

It is allowed to play from side to side while the fish bait is in action and is of such size that its pendulum swing does not extend beyond the extreme action of the fish bait itself.

It is intended, in practice, to paint the body 5 in varying color schemes. I have found a white body with a red head end to be very effective in use.

Having described my invention, what I claim is:—

1. A fish lure comprising a body, hooks carried thereby, said body having a depression in its forward end, and a plug projecting forwardly from the center of said depression, said body being cut away at its forward end at one side and at an angle intersecting said depression.

2. A fish lure of the character described comprising an elongated body, hooks at the rear end thereof and hooks depending from the lower side thereof, the forward end of said body being provided with a cup-like depression, a tapered plug projecting forwardly from the center of said depression, said body being cut away at an acute angle at one side and at its forward end in such manner that the cut intersects a part of said plug, and line engaging means at the forward end of said plug.

3. A fish lure of the character described comprising an elongated body, hooks at the rear end thereof, hooks hanging downwardly from the lower side thereof, said body being provided with a tapered cup-like depression in its forward end, a forwardly projecting tapered plug at the center of said depression, and line engaging means at the forward end of said plug, said body being cut away at an acute angle at one side in such manner as to intersect said depression and said plug and to cut through the plug slightly above the center.

In testimony whereof I affix my signature.

DELBERT V. CUMMINS.